United States Patent
Li et al.

(10) Patent No.: US 12,546,994 B2
(45) Date of Patent: Feb. 10, 2026

(54) HEAD-UP DISPLAY SYSTEM AND IMAGE DISPLAY METHOD BASED ON HEAD-UP DISPLAY SYSTEM

(71) Applicant: SHENZHEN YINWANG INTELLIGENT TECHNOLOGIES CO., LTD., Shenzhen (CN)

(72) Inventors: Shimao Li, Dongguan (CN); Yunfei Yan, Dongguan (CN); Jinlei Wang, Dongguan (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 567 days.

(21) Appl. No.: 17/986,752

(22) Filed: Nov. 14, 2022

(65) Prior Publication Data
US 2023/0075619 A1    Mar. 9, 2023

Related U.S. Application Data (63) Continuation of application No. PCT/CN2021/092081, filed on May 7, 2021.

(30) Foreign Application Priority Data

May 15, 2020 (CN) .......................... 202010413886.8

(51) Int. Cl.
*G02B 27/01* (2006.01)
*B60K 35/22* (2024.01)
(Continued)

(52) U.S. Cl.
CPC .......... *G02B 27/0101* (2013.01); *B60K 35/22* (2024.01); *B60K 35/23* (2024.01);
(Continued)

(58) Field of Classification Search
CPC ..... G02B 27/00–648; G02B 2027/0105–0198; B60K 35/00–90
See application file for complete search history.

(56) References Cited

U.S. PATENT DOCUMENTS

| | | | |
|---|---|---|---|
| 5,013,134 A | 5/1991 | Smith | |
| 2018/0149865 A1 | 5/2018 | Arndt et al. | |
| 2020/0105224 A1* | 4/2020 | Higashiyama | ......... B60K 35/00 |

FOREIGN PATENT DOCUMENTS

| | | |
|---|---|---|
| CN | 205899060 U | 1/2017 |
| CN | 107703633 A | 2/2018 |

(Continued)

OTHER PUBLICATIONS

Extended European Search Report in European Appln No. 21804282.8, dated Sep. 26, 2023, 7 pages.

*Primary Examiner* — Christopher A Lamb, II
(74) *Attorney, Agent, or Firm* — Fish & Richardson P.C.

(57) ABSTRACT

A display system is provided. The display system includes a windshield, a picture generation unit (PGU), and an optical element, where the windshield includes a first windshield surface and a second windshield surface. The PGU projects a light beam corresponding to a picture generated by the PGU to the optical element. The optical element directs the light beam to the first windshield surface. The first windshield surface refracts the light beam to the second windshield surface, and reflects the light beam to a human eye for receiving. The first windshield surface refracts a light beam reflected from the second windshield surface to the human eye for receiving. After reflection by the first windshield surface, the light beam forms a first virtual image with the picture. After reflection by the second windshield surface and refraction by the first windshield surface, the light beam forms a second virtual image with the picture.

20 Claims, 5 Drawing Sheets (51) Int. Cl.
B60K 35/23 (2024.01)
B60K 35/60 (2024.01)

(52) U.S. Cl.
CPC .......... B60K 35/60 (2024.01); G02B 27/0149 (2013.01); *G02B 2027/012* (2013.01); *G02B 2027/0154* (2013.01)

(56) References Cited

FOREIGN PATENT DOCUMENTS

| | | |
|---|---|---|
| CN | 108027508 A | 5/2018 |
| CN | 108594438 A | 9/2018 |
| CN | 109387940 A | 2/2019 |
| CN | 110794580 A | 2/2020 |
| WO | 2020095612 A1 | 5/2020 |

* cited by examiner

HEAD-UP DISPLAY SYSTEM AND IMAGE DISPLAY METHOD BASED ON HEAD-UP DISPLAY SYSTEM

CROSS-REFERENCE TO RELATED APPLICATIONS

This application is a continuation of International Application No. PCT/CN2021/092081, filed on May 7, 2021, which claims priority to Chinese Patent Application No. 202010413886.8, filed on May 15, 2020. The disclosures of the aforementioned applications are hereby incorporated by reference in their entireties.

TECHNICAL FIELD

This application relates to the field of vehicles, and in particular, to a head-up display system and an image display method based on the head-up display system.

BACKGROUND

A head-up display (HUD) is an important technology for improving driving safety of a vehicle. It can project instrument information such as a driving speed and a fuel quantity and navigation information into a human eye by using components such as an imaging source and a mirror, and then establish a virtual image outside a windshield, so that a driver can observe driving information without lowering the head, thereby avoiding distracting attention, to improve driving safety and driving experience.

To ensure safety, an existing vehicle windshield is generally sandwich-shaped laminated glass, and two pieces of glass are bonded together by using a polymer film. When light projected by the HUD is incident on the windshield, the light may be reflected on two interfaces in contact with air inside and outside the windshield, and two virtual images are formed. The two virtual images may form a ghost image due to partial overlapping, which seriously affects HUD clarity.

SUMMARY

Embodiments of the present invention disclose a head-up display system and an image display method based on the head-up display system, which can effectively eliminate visual interference to a human eye caused by a ghost image of two virtual images.

According to a first aspect, this application provides an HUD system. The HUD system includes a windshield, a picture generation unit (PGU), and an optical element, where the windshield includes a first windshield surface and a second windshield surface. The PGU projects a light beam corresponding to a picture generated by the PGU to the optical element. The optical element directs the light beam to the first windshield surface. The first windshield surface refracts the light beam to the second windshield surface, and reflects the light beam to a human eye for receiving. The first windshield surface further refracts a light beam reflected from the second windshield surface to the human eye for receiving. After reflection by the first windshield surface, the light beam forms a first virtual image with the picture. After reflection by the second windshield surface and refraction by the first windshield surface, the light beam forms a second virtual image with the picture. Specifically, an included angle between the human eye and either of the first virtual image and the second virtual image is less than a preset angle. The included angle may be calculated by using a thickness of the windshield, a refractive index of the windshield, a coangle of an incident angle, on the first windshield surface, of the light beam directed by the optical element to the first windshield surface, and a distance between the first virtual image and the human eye.

It should be noted that the foregoing preset angle generally refers to a resolution of the human eye (which may also be referred to as a distinguishable angle or an angular resolution of the human eye). Generally, a resolution of a normal human eye is 0.02°. It should be understood that a specific value of the foregoing preset angle is not limited in this application, provided that an included angle between the two virtual images and the human eye is small enough so that the human eye cannot distinguish between the two virtual images.

It should be noted that points at a same position on the first virtual image and the second virtual image are selected, for example, a center point in the first virtual image and a center point in the second virtual image. In addition, a position of the human eye is considered as a point. Further, a direction from the center point of the first virtual image to the human eye is denoted as a first direction, and a direction from the center point of the second virtual image to the human eye is denoted as a second direction. In this case, an included angle between the first direction and the second direction is the included angle between the two virtual images and the human eye.

In this implementation, the picture generated by the PGU forms two virtual images in front of the windshield. The included angle between the two virtual images and the human eye is related to a plurality of parameters (for example, the thickness of the windshield, the refractive index of the windshield, the coangle of the incident angle, on the first windshield surface, of the light beam directed by the optical element to the first windshield surface, and the distance between the first virtual image and the human eye). The included angle between the two virtual images and the human eye may be less than the preset angle (for example, the resolution of the human eye) by adjusting the foregoing listed parameters. Then, the human eye cannot distinguish between the two virtual images, so that visual interference to the human eye caused by a ghost image of the two virtual images can be effectively eliminated.

In some possible implementations, the HUD system further includes a first driving apparatus and/or a second driving apparatus. The first driving apparatus is configured to adjust a position of the PGU, so that the PGU is close to or away from the optical element. The second driving apparatus is configured to adjust a position of the optical element, so that the optical element is close to or away from the PGU.

In this implementation, a distance between the PGU and the optical element can be dynamically adjusted, so that the distance between the first virtual image and the human eye can be dynamically adjusted, to ensure that the included angle between the two virtual images and the human eye is less than the preset angle, which improves practicality of the solution.

In some possible implementations, the first driving apparatus is further configured to drive the PGU to rotate, to adjust a size of the coangle of the incident angle of the light beam on the first windshield surface. The second driving apparatus is further configured to drive the optical element to rotate, to adjust the size of the coangle of the incident angle of the light beam on the first windshield surface.

In this implementation, the size of the coangle of the incident angle of the light beam on the first windshield surface can be dynamically adjusted by using the driving apparatus, to ensure that the included angle between the two virtual images and the human eye is less than the preset angle, which further improves practicality of the solution.

In some possible implementations, the distance between the first virtual image and the human eye is equal to a sum of a first distance and a second distance. The first distance is a distance between the first virtual image and a target position on the first windshield surface, the second distance is a distance between the target position on the first windshield surface and the human eye, and the first distance is determined by a focal length of the optical element and a distance between the PGU and the optical element.

In this implementation, the distance between the first virtual image and the human eye can be changed by changing the first distance and/or the second distance. Specifically, the first distance may be changed by adjusting the focal length of the optical element and the distance between the PGU and the optical element. The second distance may be changed by adjusting a distance between an observer and the windshield. Scalability of this solution is improved.

In some possible implementations, the included angle is calculated by substituting the thickness of the windshield, the refractive index of the windshield, the coangle, and the distance between the first virtual image and the human eye into a formula.

The formula is as follows:

$$\varphi = \arcsin\left[\frac{2h}{D} \times \frac{\sin(\theta 1)}{\sqrt{\frac{n^2}{\cos(\theta 1)^2} - 1}}\right].$$

φ indicates the included angle, h indicates the thickness of the windshield, n indicates the refractive index of the windshield, D indicates the distance between the first virtual image and the human eye, and θ1 indicates the coangle.

In this implementation, a specific calculation manner of the included angle between the two virtual images and the human eye is provided, which improves implementability of this solution.

In some possible implementations, there is an interlayer between the first windshield surface and the second windshield surface, and the interlayer is configured to fasten the first windshield surface and the second windshield surface together. The optical element is a curved surface reflector, a lens, a liquid crystal on silicon (LCOS), or a diffractive optical element (DOE).

According to a second aspect, this application provides an HUD system. The HUD system includes a windshield, a PGU, and an optical element, and the windshield includes a first windshield surface and a second windshield surface. The PGU projects a light beam corresponding to a picture generated by the PGU to the optical element. The optical element directs the light beam to the first windshield surface. The first windshield surface refracts the light beam to the second windshield surface, and reflects the light beam to a human eye for receiving. The first windshield surface further refracts a light beam reflected from the second windshield surface to the human eye for receiving. After reflection by the first windshield surface, the light beam forms a first virtual image with the picture. After reflection by the second windshield surface and refraction by the first windshield surface, the light beam forms a second virtual image with the picture. Specifically, an included angle between the human eye and either of the first virtual image and the second virtual image is less than a preset angle. The included angle may be calculated by using a thickness of the windshield, a refractive index of the windshield, a coangle of an incident angle, on the first windshield surface, of the light beam directed by the optical element to the first windshield surface, and a distance between the first virtual image and a target position on the first windshield surface. The included angle between the two virtual images and the human eye may be less than the preset angle (for example, a resolution of the human eye) by adjusting the foregoing listed parameters.

According to a third aspect, this application provides an image display method based on an HUD system. The HUD system includes a windshield, a PGU, and an optical element, and the windshield includes a first windshield surface and a second windshield surface. The method includes the following steps:

The PGU generates a picture and projects a light beam corresponding to the picture to the optical element; the optical element images the picture and directs the light beam to a target position on the first windshield surface; the first windshield surface refracts the light beam to the second windshield surface, and reflects the light beam to a human eye for receiving, where after reflection by the first windshield surface, the light beam forms a first virtual image with the picture; the second windshield surface reflects a light beam refracted from the first windshield surface to the first windshield surface; the first windshield surface refracts a light beam reflected from the second windshield surface to the human eye for receiving, where after reflection by the second windshield surface and refraction by the first windshield surface, the light beam forms a second virtual image with the picture; and at least one of a thickness of the windshield, a refractive index of the windshield, a coangle of an incident angle, on the first windshield surface, of the light beam directed by the optical element to the first windshield surface, and a distance between the first virtual image and the human eye is adjusted, so that an included angle between a first direction and a second direction is less than a preset angle, where the first direction is a direction from the first virtual image to the human eye, and the second direction is a direction from the second virtual image to the human eye.

In some possible implementations, the HUD system further includes a first driving apparatus and/or a second driving apparatus. The method further includes the following steps:

The first driving apparatus adjusts a position of the PGU, so that the PGU is close to or away from the optical element; and the second driving apparatus adjusts a position of the optical element, so that the optical element is close to or away from the PGU.

In some possible implementations, the method further includes the following steps:

The first driving apparatus drives the PGU to rotate, to adjust a size of the coangle; and the second driving apparatus drives the optical element to rotate, to adjust the size of the coangle.

In some possible implementations, the distance between the first virtual image and the human eye is equal to a sum of a first distance and a second distance. The first distance is a distance between the first virtual image and the target position on the first windshield surface, and the second distance is a distance between the target position on the first windshield surface and the human eye. The method further includes:

changing the first distance by adjusting a focal length of the optical element and a distance between the PGU and the optical element.

In some possible implementations, the included angle is calculated by substituting the thickness of the windshield, the refractive index of the windshield, the coangle, and the distance between the first virtual image and the human eye into a formula.

The formula is as follows:

$$\varphi = \arcsin\left[\frac{2h}{D} \times \frac{\sin(\theta_1)}{\sqrt{\frac{n^2}{\cos(\theta_1)^2} - 1}}\right].$$

φ indicates the included angle, h indicates the thickness of the windshield, n indicates the refractive index of the windshield, D indicates the distance between the first virtual image and the human eye, and θ1 indicates the coangle.

In some possible implementations, there is an interlayer between the first windshield surface and the second windshield surface, and the interlayer is configured to fasten the first windshield surface and the second windshield surface together; and the optical element is a curved surface reflector, a lens, an LCOS, or a DOE.

In this embodiment of this application, the picture generated by the PGU forms two virtual images in front of the windshield. The included angle between the two virtual images and the human eye is related to a plurality of parameters (for example, the thickness of the windshield, the refractive index of the windshield, the coangle of the incident angle, on the first windshield surface, of the light beam directed by the optical element to the first windshield surface, and the distance between the first virtual image and the human eye). The included angle between the two virtual images and the human eye may be less than the preset angle (for example, the resolution of the human eye) by adjusting the foregoing listed parameters. Then, the human eye cannot distinguish between the two virtual images, so that visual interference to the human eye caused by a ghost image of the two virtual images can be effectively eliminated.

DESCRIPTION OF EMBODIMENTS

Embodiments of this application provide a head-up display system and an image display method based on the head-up display system, which can effectively eliminate visual interference to a human eye caused by a ghost image of two virtual images. In the specification, claims, and accompanying drawings of this application, the terms "first", "second", "third", "fourth", and the like (if existent) are intended to distinguish between similar objects but do not necessarily indicate a specific order or sequence. It should be understood that the data termed in such a way are interchangeable in proper circumstances so that embodiments described herein can be implemented in other orders than the order illustrated or described herein. Moreover, the terms "include", "comprise" and any other variants mean to cover the non-exclusive inclusion, for example, a process, method, system, product, or device that includes a list of steps or units is not necessarily limited to those steps or units, but may include other steps or units not expressly listed or inherent to such a process, method, system, product, or device.

Figure 1:
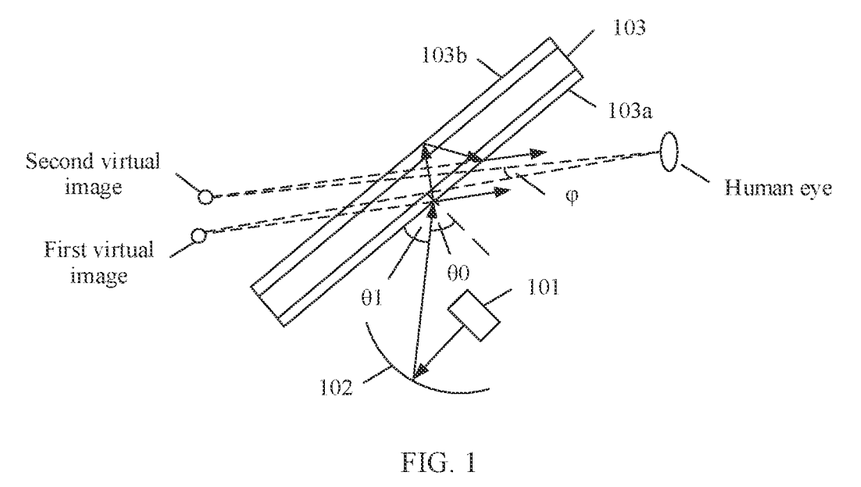
FIG. 1 is a structural diagram of a first HUD system according to an embodiment of this application.

FIG. 1 is a structural diagram of a first head-up display (HUD) system according to an embodiment of this application. The HUD system includes a picture generation unit (PGU) 101, an optical element 102, and a windshield 103. The windshield 103 has two surfaces inside and outside: a first windshield surface 103a and a second windshield surface 103b. The picture generation unit 101 generates a picture, and projects a light beam corresponding to the picture to the optical element 102. The optical element 102 images the picture and directs the light beam to the first windshield surface 103a. Reflection and refraction happen when the light beam is incident on the first windshield surface 103a. A light beam refracted from the first windshield surface 103a is directed to the second windshield surface 103b. A light beam reflected from the first windshield surface 103a can be received by a human eye. It should be understood that after reflection by the first windshield surface 103a, the light beam forms a first virtual image with the picture. The second windshield surface 103b reflects the light beam refracted from the first windshield surface 103a, to the first windshield surface 103a. Further, the light beam reflected from the second windshield surface 103b is refracted on the first windshield surface 103a, and can be received by the human eye. It should be understood that after reflection by the second windshield surface 103b and refraction by the first windshield surface 103a, the light beam forms a second virtual image with the picture.

As shown in FIG. 1, imaging positions of the first virtual image and the second virtual image are different in space. Therefore, the first virtual image and the second virtual image may form a ghost image due to partial overlapping, thereby causing visual interference to an observer. To eliminate the ghost image seen by the human eye, an included angle between the two virtual images and the human eye needs to be less than a resolution of the human eye. That is, the imaging positions of the two virtual images in space need to be as close as possible, so that the human eye can no longer perceive the ghost image.

It should be noted that the included angle between the two virtual images and the human eye is affected by a plurality of parameters. Therefore, the plurality of parameters need to be adjusted, so that the included angle between the two virtual images and the human eye is less than the preset angle (for example, the resolution of the human eye). Details are described below.

Specifically, points at a same position on the first virtual image and the second virtual image are selected, for example, a center point in the first virtual image and a center point in the second virtual image. In addition, a position of the human eye is considered as a point. Further, a direction from the center point of the first virtual image to the human eye is denoted as a first direction, and a direction from the center point of the second virtual image to the human eye is denoted as a second direction. In this case, an included angle between the first direction and the second direction is the included angle between the two virtual images and the human eye.

The included angle may be specifically calculated by using the following formula:

$$\varphi = \arcsin\left[\frac{2h}{D} \times \frac{\sin(\theta_1)}{\sqrt{\frac{n^2}{\cos(\theta_1)^2} - 1}}\right].$$

$\varphi$ indicates the included angle between the two virtual images and the human eye, h indicates a thickness of the windshield, n indicates a refractive index of the windshield, and D indicates a distance between the first virtual image and the human eye. $\theta_1$ indicates a coangle of an incident angle $\theta_0$, on the first windshield surface 103a, of the light beam directed by the optical element 102 to the first windshield surface 103a.

It should be noted that the distance D between the first virtual image and the human eye includes a distance d1 from the first virtual image to the first windshield surface 103a and a distance d2 from the first windshield surface 103a to the human eye. Specifically, the light beam directed by the optical element 102 to the first windshield surface is incident at a target position. In this case, a distance from the target position to the first virtual image is d1, and a distance from the target position to the human eye is d2.

It should be understood that, because of uncertainty in selecting an eye position, only an approximate value is calculated according to the foregoing formula. However, it can be determined that the included angle between the two virtual images and the human eye is determined by using the foregoing listed parameters. For example, the resolution of the human eye is 0.02° below, and several possible implementations are listed, so that the included angle between the two virtual images and the human eye is less than 0.02°.

Figure 2:
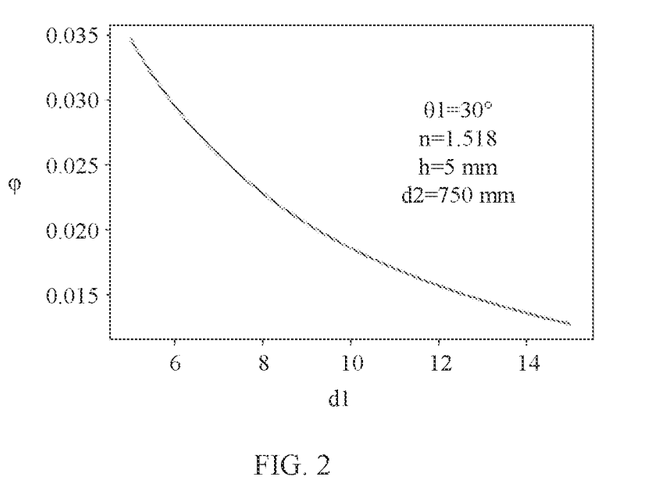
FIG. 2 is a schematic diagram of a parameter change in the first HUD system.

FIG. 2 is a schematic diagram of a parameter change in the first HUD system. As shown in FIG. 2, a vertical coordinate indicates the included angle $\varphi$ between the two virtual images and the human eye. A horizontal coordinate indicates the distance d1 from the first virtual image to the first windshield surface 103a. FIG. 2 is a schematic diagram in which when another parameter is determined, $\varphi$ changes with d1. $\theta_1$=30°, n=1.518, h=5 mm, and d2=750 mm. It can be learned from FIG. 2 that d1 needs to be set to be greater than 10 m to meet that $\varphi$ is less than 0.02°.

Figure 3:
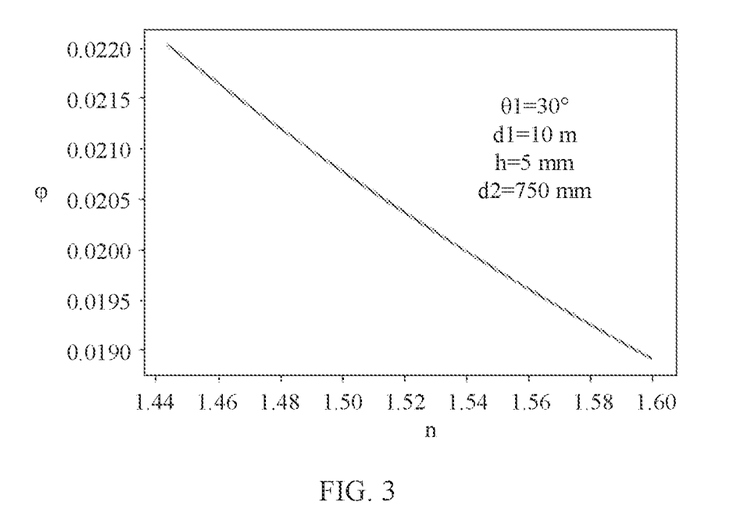
FIG. 3 is a schematic diagram of a parameter change in a second HUD system.

FIG. 3 is a schematic diagram of a parameter change in a second HUD system. As shown in FIG. 3, a vertical coordinate indicates the included angle $\varphi$ between the two virtual images and the human eye. A horizontal coordinate indicates the refractive index n of the windshield. FIG. 3 is a schematic diagram in which when another parameter is determined, p changes with n. $\theta_1$=30°, d1=10 m, h=5 mm, and d2=750 mm. It can be learned from FIG. 3 that n needs to be set to be greater than 1.44, and a specific value range may be 1.44 to 1.8.

Figure 4:
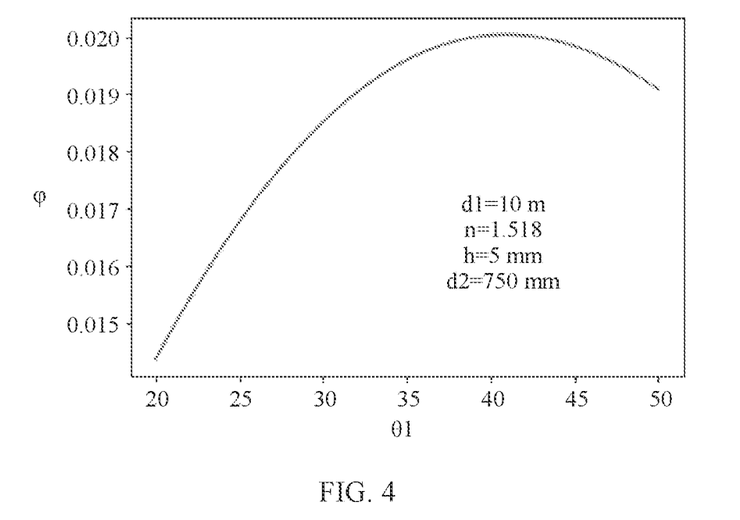
FIG. 4 is a schematic diagram of a parameter change in a third HUD system.

FIG. 4 is a schematic diagram of a parameter change in a third HUD system. As shown in FIG. 4, a vertical coordinate indicates the included angle $\varphi$ between the two virtual images and the human eye. A horizontal coordinate indicates $\theta_1$. FIG. 4 is a schematic diagram in which when another parameter is determined, $\varphi$ changes with $\theta_1$. n=1.518, d1=10 m, h=5 mm, and d2=750 mm. Specifically, a value range of $\theta_1$ may be 20° to 80°.

Figure 5:
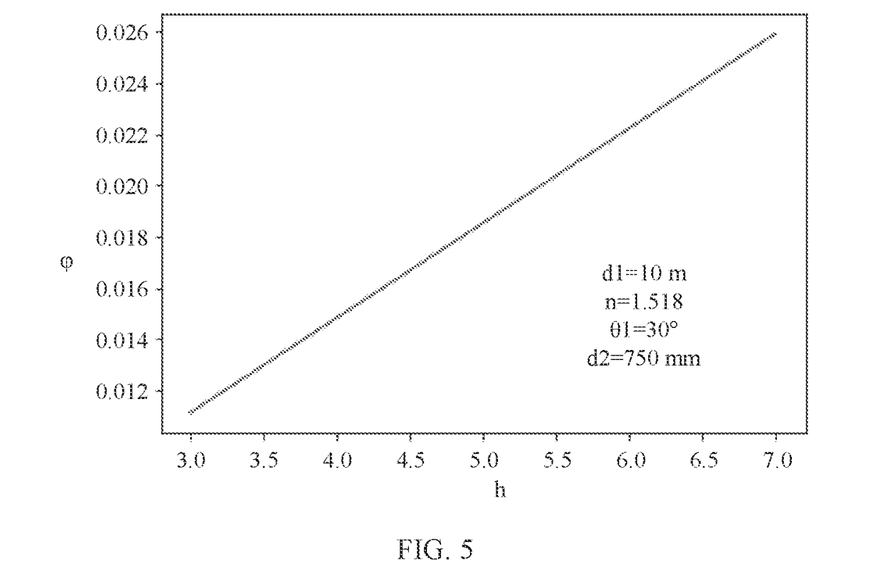
FIG. 5 is a schematic diagram of a parameter change in a fourth HUD system.

FIG. 5 is a schematic diagram of a parameter change in a fourth HUD system. As shown in FIG. 5, a vertical coordinate indicates the included angle $\varphi$ between the two virtual images and the human eye. A horizontal coordinate indicates the thickness h of the windshield. FIG. 5 is a schematic diagram in which when another parameter is determined, $\varphi$ changes with h. $\theta_1$=30°, d1=10 m, n=1.518, and d2=750 mm. It can be learned from FIG. 5 that h needs to be set to be less than 6 mm.

It may be understood that in actual application, specific values of the foregoing parameters include but are not limited to examples listed in FIG. 2 to FIG. 5. In addition, the resolution of the human eye includes but is not limited to 0.02° listed above. All cases in which a combination of the foregoing parameters can enable the included angle between the two virtual images and the human eye to be less than the preset angle fall within the scope of this application, except a case in which the foregoing parameters are preset. In some possible implementations, some of the parameters may be dynamically adjusted. The following provides several specific implementations.

First, adjust the foregoing parameter d1.

It may be understood that the foregoing parameter d1 is determined by a focal length of the optical element 102 and a distance between the picture generation unit 101 and the optical element 102. For example, if the distance between the picture generation unit 101 and the optical element 102 is less than the focal length of the optical element 102, a magnified virtual image may be obtained, and a distance between the virtual image and the human eye is relatively long. Therefore, the foregoing parameter d1 can be changed by adjusting the distance between the picture generation unit 101 and the optical element 102 and/or the focal length of the optical element 102.

Figure 6:
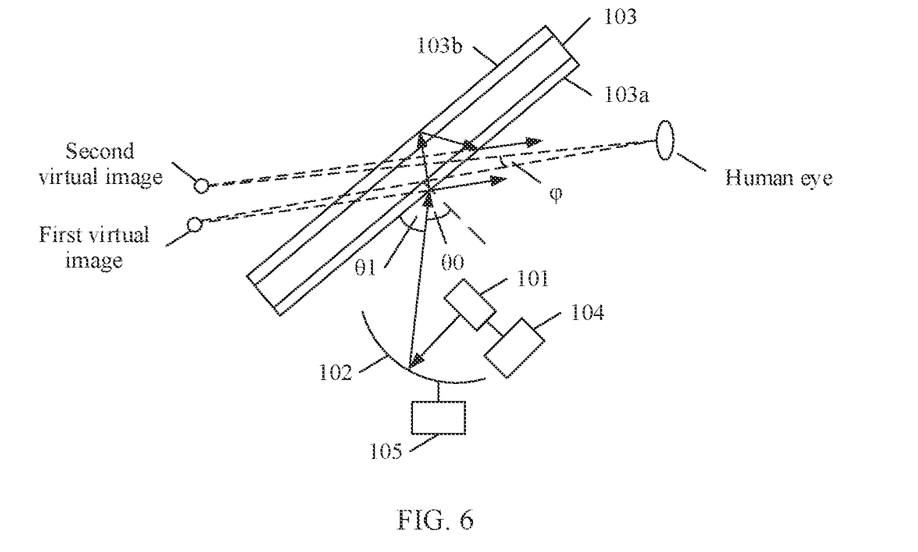
FIG. 6 is a structural diagram of the second HUD system according to an embodiment of this application.

FIG. 6 is a structural diagram of the second HUD system according to an embodiment of this application. Compared with the HUD system shown in FIG. 1, the HUD system shown in FIG. 6 further includes a first driving apparatus 104 and/or a second driving apparatus 105. Specifically, the first driving apparatus 104 is configured to adjust a position of the picture generation unit 101. The second driving apparatus 105 is configured to adjust a position of the optical element 102. The distance between the picture generation unit 101 and the optical element 102 can be changed by using the first driving apparatus 104 and/or the second driving apparatus 105, to adjust the foregoing parameter d1.

Optionally, for some optical elements 102 of specific structures, focal lengths of the optical elements 102 may alternatively be dynamically adjusted. For example, the optical element 102 is a liquid crystal on silicon (LCOS). A focal length of the LCOS may be changed by loading different modulation information on the LCOS, to adjust the foregoing parameter d1.

Second, adjust the foregoing parameter $\theta_1$.

Based on the HUD system shown in FIG. 6, the first driving apparatus 104 may drive the picture generation unit 101 to rotate, to change an angle of a light beam incident on the optical element 102, thereby implementing adjustment of the foregoing parameter $\theta_1$. Similarly, the second driving apparatus 105 may drive the optical element 102 to rotate, to change an angle of a light beam incident on the first windshield surface 103a, thereby implementing adjustment of the foregoing parameter $\theta_1$.

Third, adjust the foregoing parameter n.

Specifically, a temperature of the windshield 103 may be changed by using a temperature adjustment apparatus, to change the refractive index n of the windshield. Alternatively, a voltage loaded on the windshield 103 is changed by using a power supply to change the refractive index n of the windshield.

Figure 7:
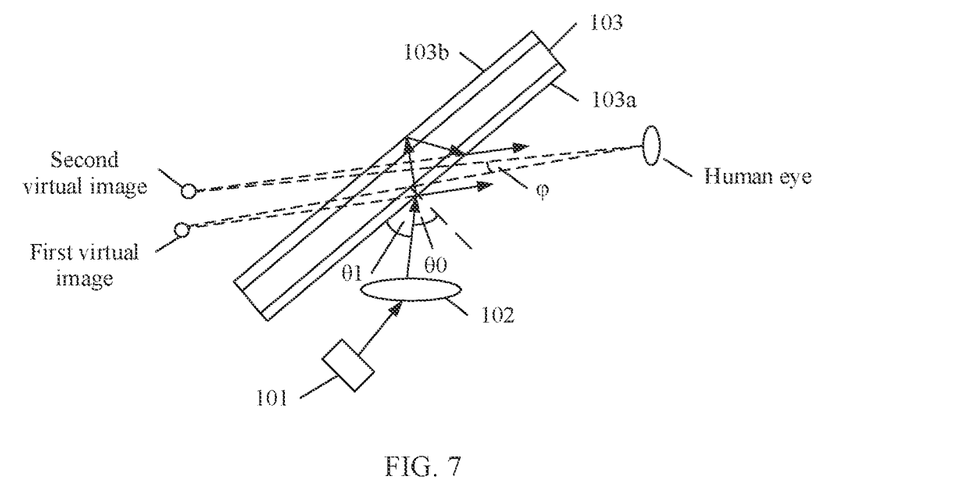
FIG. 7 is a structural diagram of the third HUD system according to an embodiment of this application.

It should be noted that the optical element 102 may be a reflector, such as a freeform mirror, an aspherical mirror, a reflective LCOS, or a diffractive optical element (DOE). A specific optical path is shown in FIG. 1. Alternatively, the optical element 102 may be a lens, a transmissive liquid crystal display (LCD), or the like. A specific optical path is shown in FIG. 7. FIG. 7 is a structural diagram of the third HUD system according to an embodiment of this application.

Figure 8:
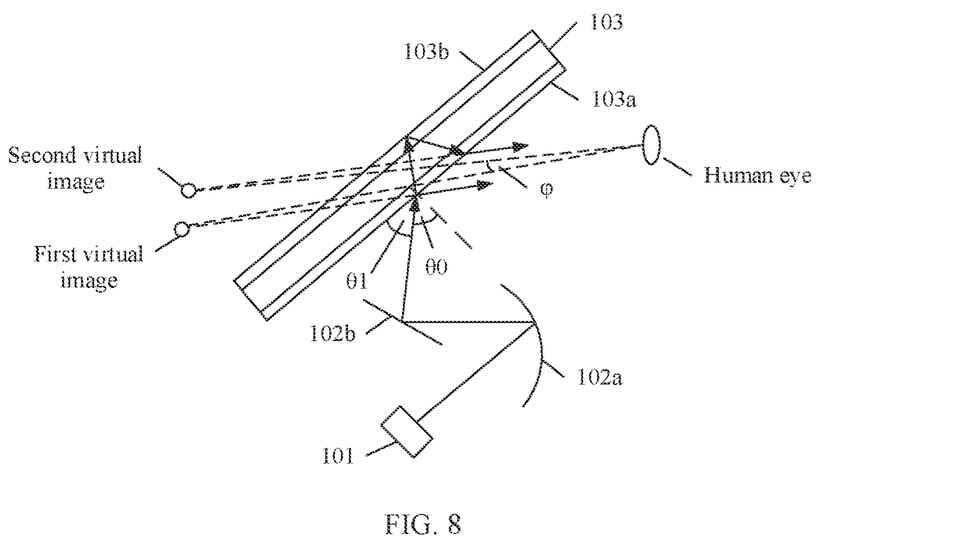
FIG. 8 is a structural diagram of the fourth HUD system according to an embodiment of this application.

Optionally, in the HUD system of this application, a plurality of optical elements 102 may further be disposed to form an imaging system, and a light beam from the picture generation unit 101 is directed to the first windshield surface 103a. A specific quantity of optical elements 102 is not limited in this application. For example, FIG. 8 is a structural diagram of the fourth HUD system according to an embodiment of this application. The optical element 102 includes a first reflection element 102a and a second reflection element 102b. The light beam transmitted by the picture generation unit 101 is successively reflected by the first reflection element 102a and the second reflection element 102b and then is directed to the first windshield surface 103a.

In some possible implementations, the windshield 103 is a sandwich structure, that is, the first windshield surface 103a and the second windshield surface 103b are bonded together by using a polymer.

In this embodiment of this application, the picture generated by the PGU forms two virtual images in front of the windshield. The included angle between the two virtual images and the human eye is related to a plurality of parameters (for example, the thickness of the windshield, the refractive index of the windshield, the coangle of the incident angle, on the first windshield surface, of the light beam directed by the optical element to the first windshield surface, and the distance between the first virtual image and the human eye). The included angle between the two virtual images and the human eye may be less than the preset angle (for example, the resolution of the human eye) by adjusting the foregoing listed parameters. Then, the human eye cannot distinguish between the two virtual images, so that visual interference to the human eye caused by a ghost image of the two virtual images can be effectively eliminated.

Figure 9:
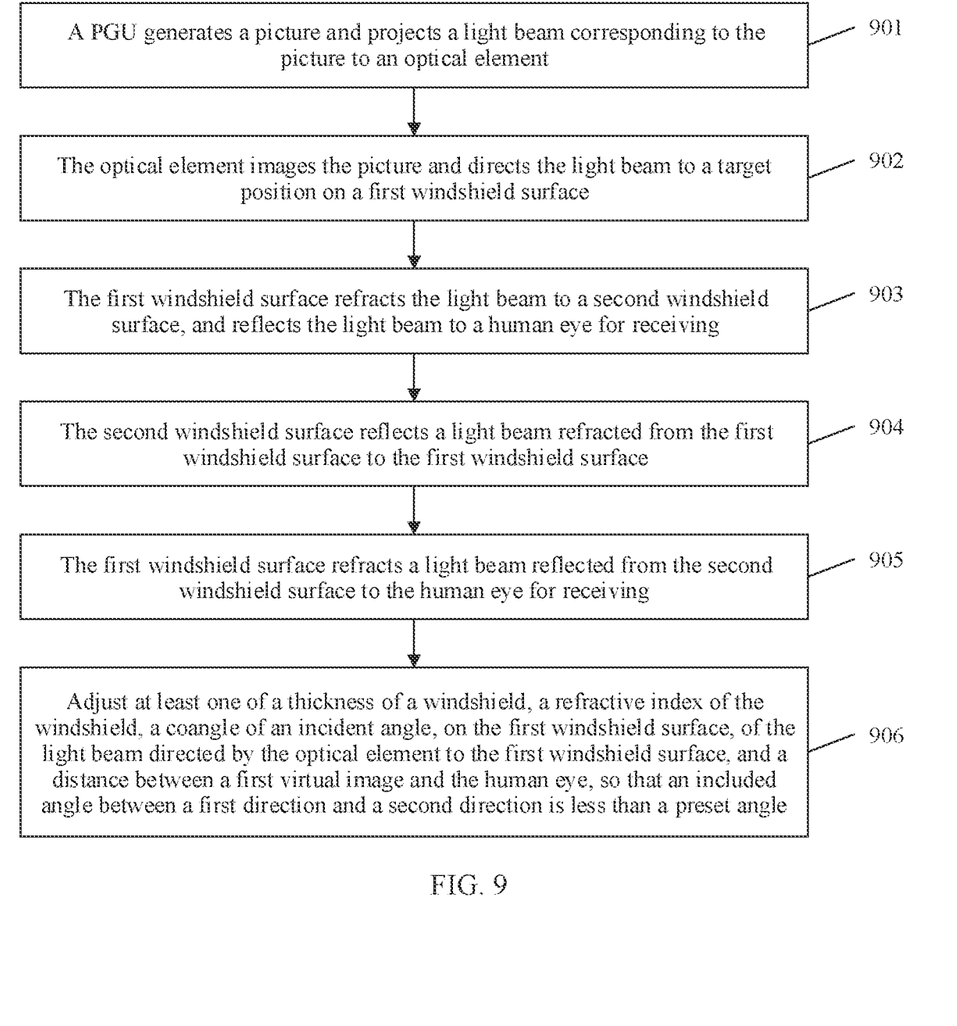
FIG. 9 is a schematic diagram of an image display method based on an HUD system according to an embodiment.

FIG. 9 is a schematic diagram of an image display method based on an HUD system according to an embodiment. The HUD system includes a windshield, a PGU, and an optical element, and the windshield includes a first windshield surface and a second windshield surface. The image display method includes:

901: The PGU generates a picture and projects a light beam corresponding to the picture to the optical element.

902: The optical element images the picture and directs the light beam to a target position on the first windshield surface.

903: The first windshield surface refracts the light beam to the second windshield surface, and reflects the light beam to a human eye for receiving.

Specifically, after reflection by the first windshield surface, the light beam forms a first virtual image with the picture.

904: The second windshield surface reflects a light beam refracted from the first windshield surface to the first windshield surface.

905: The first windshield surface refracts a light beam reflected from the second windshield surface to the human eye for receiving.

Specifically, after reflection by the second windshield surface and refraction by the first windshield surface, the light beam forms a second virtual image with the picture.

906: Adjust at least one of a thickness of the windshield, a refractive index of the windshield, a coangle of an incident angle, on the first windshield surface, of the light beam directed by the optical element to the first windshield surface, and a distance between the first virtual image and the human eye, so that an included angle between a first direction and a second direction is less than a preset angle.

Specifically, the first direction is a direction from the first virtual image to the human eye, and the second direction is a direction from the second virtual image to the human eye.

Optionally, in some possible implementations, the HUD system further includes a first driving apparatus and/or a second driving apparatus. The method further includes the following steps:

The first driving apparatus adjusts a position of the PGU, so that the PGU is close to or away from the optical element; and the second driving apparatus adjusts a position of the optical element, so that the optical element is close to or away from the PGU.

Optionally, in some possible implementations, the method further includes the following steps:

The first driving apparatus drives the PGU to rotate, to adjust a size of the coangle; and the second driving apparatus drives the optical element to rotate, to adjust the size of the coangle.

Optionally, in some possible implementations, the distance between the first virtual image and the human eye is equal to a sum of a first distance and a second distance. The first distance is a distance between the first virtual image and the target position on the first windshield surface, and the second distance is a distance between the target position on the first windshield surface and the human eye. The method further includes:

changing the first distance by adjusting a focal length of the optical element and a distance between the PGU and the optical element.

It should be noted that the HUD system in this embodiment may be specifically the HUD system in the embodiments shown in FIG. 1, FIG. 6, FIG. 7, and FIG. 8. Details are not described herein again.

It should be noted that the foregoing embodiments are merely used to describe the technical solutions of this application, but do not impose a limitation thereon. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of embodiments of this application.

What is claimed is:

1. A head-up display (HUD) system, wherein the HUD system comprises a windshield, a picture generation unit (PGU), and an optical element, wherein the windshield comprises a first windshield surface and a second windshield surface;

the PGU is configured to generate a picture, and project a light beam corresponding to the picture to the optical element;

the optical element is configured to image the picture and direct the light beam to a target position on the first windshield surface;

the first windshield surface is configured to refract the light beam to the second windshield surface, and reflect the light beam to a human eye for receiving, wherein after reflection by the first windshield surface, the light beam forms a first virtual image with the picture;

the second windshield surface is configured to reflect a light beam refracted from the first windshield surface to the first windshield surface;

the first windshield surface is further configured to refract a light beam reflected from the second windshield surface to the human eye for receiving, wherein after reflection by the second windshield surface and refraction by the first windshield surface, the light beam forms a second virtual image with the picture; and at least one processor configured to calculate an included angle between a first direction and a second direction based on a thickness of the windshield, a refractive index of the windshield, a coangle of an incident angle of the light beam directed by the optical element to the first windshield surface, and a distance between the first virtual image and the human eye, wherein the first direction is a direction from the first virtual image to the human eye, and the second direction is a direction from the second virtual image to the human eye.

2. The HUD system according to claim 1, wherein the HUD system further comprises at least one of a first driving apparatus and a second driving apparatus;

the first driving apparatus is configured to adjust a position of the PGU to make the PGU close to or away from the optical element, and the second driving apparatus is configured to adjust a position of the optical element to make the optical element close to or away from the PGU.

3. The HUD system according to claim 2, wherein the first driving apparatus is further configured to drive the PGU to rotate, to adjust a size of the coangle; and the second driving apparatus is further configured to drive the optical element to rotate, to adjust the size of the coangle.

4. The HUD system according to claim 1, wherein the distance between the first virtual image and the human eye is equal to a sum of a first distance and a second distance, the first distance is a distance between the first virtual image and the target position on the first windshield surface, the second distance is a distance between the target position on the first windshield surface and the human eye, and the first distance is determined by a focal length of the optical element and a distance between the PGU and the optical element.

5. The HUD system according to claim 1, wherein the included angle is calculated by substituting the thickness of the windshield, the refractive index of the windshield, the coangle, and the distance between the first virtual image and the human eye into a formula; and the formula is $$\varphi = \arcsin\left[\frac{2h}{D} \times \frac{\sin(\theta_1)}{\sqrt{\frac{n^2}{\cos(\theta_1)^2} - 1}}\right],$$

wherein

φ indicates the included angle, h indicates the thickness of the windshield, n indicates the refractive index of the windshield, D indicates the distance between the first virtual image and the human eye, and θ1 indicates the coangle.

6. The HUD system according to claim 1, wherein there is an interlayer between the first windshield surface and the second windshield surface, and the interlayer is configured to fasten the first windshield surface and the second windshield surface together; and the optical element is a curved surface reflector, a lens, a liquid crystal on silicon (LCOS), or a diffractive optical element (DOE).

7. A head-up display (HUD) system, wherein the HUD system comprises a windshield, a picture generation unit (PGU), and an optical element, wherein the windshield comprises a first windshield surface and a second windshield surface;

the PGU is configured to generate a picture, and project a light beam corresponding to the picture to the optical element;

the optical element is configured to image the picture and direct the light beam to a target position on the first windshield surface;

the first windshield surface is configured to refract the light beam to the second windshield surface, and reflect the light beam to a human eye for receiving, wherein after reflection by the first windshield surface, the light beam forms a first virtual image with the picture;

the second windshield surface is configured to reflect a light beam refracted from the first windshield surface to the first windshield surface;

the first windshield surface is further configured to refract a light beam reflected from the second windshield surface to the human eye for receiving, wherein after reflection by the second windshield surface and refraction by the first windshield surface, the light beam forms a second virtual image with the picture; and at least one processor configured to calculate an included angle between a first direction and a second direction based on a thickness of the windshield, a refractive index of the windshield, a coangle of an incident angle of the light beam directed by the optical element to the first windshield surface, and a distance between the first virtual image and the target position on the first windshield surface, and wherein the first direction is a direction from the first virtual image to the human eye, and the second direction is a direction from the second virtual image to the human eye.

8. The HUD system according to claim 7, wherein the HUD system further comprises at least one of a first driving apparatus and a second driving apparatus;

the first driving apparatus is configured to adjust a position of the PGU to make the PGU close to or away from the optical element; and the second driving apparatus is configured to adjust a position of the optical element to make the optical element close to or away from the PGU.

9. The HUD system according to claim 8, wherein the first driving apparatus is further configured to drive the PGU to rotate, to adjust a size of the coangle; and the second driving apparatus is further configured to drive the optical element to rotate, to adjust the size of the coangle.

10. An image display method applied to an HUD system, wherein the HUD system comprises a windshield, a PGU, and an optical element, wherein the windshield comprises a first windshield surface and a second windshield surface; and the method comprises:

generating, by the PGU, a picture, and projecting a light beam corresponding to the picture to the optical element;

imaging, by the optical element, the picture, and directing the light beam to a target position on the first windshield surface;

refracting, by the first windshield surface, the light beam to the second windshield surface, and reflecting the light beam to a human eye for receiving, wherein after reflection by the first windshield surface, the light beam forms a first virtual image with the picture;

reflecting, by the second windshield surface, a light beam refracted from the first windshield surface to the first windshield surface;

refracting, by the first windshield surface, a light beam reflected from the second windshield surface to the human eye for receiving, wherein after reflection by the second windshield surface and refraction by the first windshield surface, the light beam forms a second virtual image with the picture;

calculating an included angle between a first direction and a second direction based on a thickness of the windshield, a refractive index of the windshield, a coangle of an incident angle of the light beam directed by the optical element to the first windshield surface, and a distance between the first virtual image and the human eye, wherein the first direction is a direction from the first virtual image to the human eye, and the second direction is a direction from the second virtual image to the human eye; and adjusting at least one of the thickness of the windshield, the refractive index of the windshield, the coangle of an incident angle of the light beam directed by the optical element to the first windshield surface, or the distance between the first virtual image and the human eye to adjust the included angle between the first direction and the second direction to be less than a preset angle.

11. The method according to claim 10, wherein the HUD system further comprises at least one of a first driving apparatus and a second driving apparatus; and the method further comprises:

adjusting, by the first driving apparatus, a position of the PGU to make the PGU close to or away from the optical element; and adjusting, by the second driving apparatus, a position of the optical element to make the optical element close to or away from the PGU.

12. The method according to claim 11, wherein the method further comprises:

driving, by the first driving apparatus, the PGU to rotate, to adjust a size of the coangle; and driving, by the second driving apparatus, the optical element to rotate, to adjust the size of the coangle.

13. The method according to claim 10, wherein the distance between the first virtual image and the human eye is equal to a sum of a first distance and a second distance, the first distance is a distance between the first virtual image and the target position on the first windshield surface, and the second distance is a distance between the target position on the first windshield surface and the human eye; and the method further comprises:

changing the first distance by adjusting a focal length of the optical element and a distance between the PGU and the optical element.

14. The method according to claim 10, wherein the included angle is calculated by substituting the thickness of the windshield, the refractive index of the windshield, the coangle, and the distance between the first virtual image and the human eye into a formula; and the formula is $$\varphi = \arcsin\left[\frac{2h}{D} \times \frac{\sin(\theta_1)}{\sqrt{\frac{n^2}{\cos(\theta_1)^2} - 1}}\right],$$

wherein $\varphi$ indicates the included angle, h indicates the thickness of the windshield, n indicates the refractive index of the windshield, D indicates the distance between the first virtual image and the human eye, and $\theta 1$ indicates the coangle.

15. The method according to claim 10, wherein there is an interlayer between the first windshield surface and the second windshield surface, and the interlayer is configured to fasten the first windshield surface and the second windshield surface together; and the optical element is a curved surface reflector, a lens, a liquid crystal on silicon (LCOS), or a diffractive optical element (DOE).

16. A display apparatus, wherein the display apparatus comprises a picture generation unit (PGU) and an optical element, wherein the PGU is configured to generate a picture, and project a light beam corresponding to the picture to the optical element; and the optical element is configured to image the picture and direct the light beam to a target position on a first windshield surface of a windshield, wherein the first windshield surface is configured to refract the light beam to a second windshield surface of the windshield, and reflect the light beam to a human eye for receiving, wherein after reflection by the first windshield surface, the light beam forms a first virtual image with the picture; the second windshield surface is configured to reflect a light beam refracted from the first windshield surface to the first windshield surface; the first windshield surface is further configured to refract a light beam reflected from the second windshield surface to the human eye for receiving, wherein after reflection by the second windshield surface and refraction by the first windshield surface, the light beam forms a second virtual image with the picture; and at least one processor configured to calculate an included angle between a first direction and a second direction based on a thickness of the windshield, a refractive index of the windshield, a coangle of an incident angle of the light beam directed by the optical element to the first windshield surface, and a distance between the first virtual image and the human eye, wherein the first direction is a direction from the first virtual image to the human eye, and the second direction is a direction from the second virtual image to the human eye.

17. The display apparatus according to claim 16, further comprising at least one of a first driving apparatus and a second driving apparatus, wherein
the first driving apparatus is configured to adjust a position of the PGU to make the PGU close to or away from the optical element; and
the second driving apparatus is configured to adjust a position of the optical element to make the optical element close to or away from the PGU.

18. The display apparatus according to claim 17, wherein the first driving apparatus is further configured to drive the PGU to rotate, to adjust a size of the coangle; and
the second driving apparatus is further configured to drive the optical element to rotate, to adjust the size of the coangle.

19. The display apparatus according to claim 16, wherein the included angle is calculated by substituting the thickness of the windshield, the refractive index of the windshield, the coangle, and the distance between the first virtual image and the human eye into a formula; and the formula is $$\varphi = \arcsin\left[\frac{2h}{D} \times \frac{\sin(\theta_1)}{\sqrt{\frac{n^2}{\cos(\theta_1)^2} - 1}}\right],$$

wherein
φ indicates the included angle, h indicates the thickness of the windshield, n indicates the refractive index of the windshield, D indicates the distance between the first virtual image and the human eye, and θ1 indicates the coangle.

20. The display apparatus according to claim 16, wherein the optical element is a curved surface reflector, a lens, a liquid crystal on silicon (LCOS), or a diffractive optical element (DOE).

\* \* \* \* \*